(12) United States Patent
Slonecker

(10) Patent No.: US 6,553,954 B1
(45) Date of Patent: Apr. 29, 2003

(54) COMPACT INTAKE MANIFOLD WITH LONG RUNNERS FOR SIX-CYLINDER IN-LINE ENGINES

(76) Inventor: Lloyd Leon Slonecker, 266 Figueroa St., Eugene, OR (US) 97402

( * ) Notice: Subject to any disclaimer, the term of this patent is extended or adjusted under 35 U.S.C. 154(b) by 0 days.

(21) Appl. No.: 10/085,654

(22) Filed: Mar. 1, 2002

(51) Int. Cl.[7] ................................................ F02M 35/10
(52) U.S. Cl. ......................... 123/184.38; 123/184.55; 123/184.21; 123/52.1
(58) Field of Search ................ 123/184.38, 184.55, 123/184.21, 52.1

(56) References Cited

U.S. PATENT DOCUMENTS 2,862,490 A * 12/1958 Trisler .................... 123/547
5,596,961 A * 1/1997 Faber .................... 123/184.38

* cited by examiner

*Primary Examiner*—Tony M. Argenbright
*Assistant Examiner*—Katrina B. Harris

(57) ABSTRACT

A compact intake manifold for an in-line six cylinder engine, having six independent runners of equal length emanating from a centrally disposed plenum and traveling in a substantially single plane. Runners serving the two most rearward and the two most forward engine intake ports begin travel in a path along the longitudinal axis of the engine and make only one turn of substantially 90 degrees toward the engine. Runners serving the two central intake ports also begin travel in a path along the longitudinal axis of the engine but take a somewhat serpentine path of one turn of substantially 180 degrees and one turn of substantially 90 degrees.

4 Claims, 2 Drawing Sheets

COMPACT INTAKE MANIFOLD WITH LONG RUNNERS FOR SIX-CYLINDER IN-LINE ENGINES

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, TABLE, PROGRAM, OR CD APPENDIX

Not Applicable

BACKGROUND OF THE INVENTION

The invention relates to an intake manifold for a six-cylinder in-line internal combustion engine, in particular a manifold that provides for a single plenum and long individual intake runners in a compact unit.

Intake manifolds of internal combustion engines transport combustion air or a combustible air/fuel mixture to the cylinders of the engine. A carburetor or other type of air control valve typically mounts over the plenum of the manifold. Air enters the plenum through the air controlling valve and travels to the individual cylinders in individual ducts that are commonly referred to as runners. It has been shown that as runner length increases there is a positive effect on engine performance. This is due to a more consistent airflow at the intake port as a result of the inertia energy created as the air or air/fuel mixture travels toward the engines intake valves, and is commonly referred to as inertia charging. Although there are diminishing returns on increasing runner length, the limited space under-hood of an automobile is the usual factor in determining the practical length of intake runners. It is therefore of great importance to make a manifold that provides the benefit of long runners in a compact arrangement. In addition to length and compactness parameters, a useful manifold should be as simple in construction as possible in order to be economical to produce.

Accomplishing a compact, long runner manifold for a six-cylinder in-line engine presents a greater challenge than a four-cylinder in-line engine or a V shaped engine of six or eight cylinders. This is due to the greater overall length of the six cylinder in-line engine, which puts the air controlling device significantly closer to some intake ports than others when the air controlling valve is mounted in close proximity to the engine.

An overview of the prior art and their corresponding shortcomings can be roughly divided into three categories, as follows:

Category One; using a long or large volume plenum ("surge tank") to make up the air control valve-to-runner distance differential. Examples would be U.S. Pat. Nos. 1,942,226, 3,945,357, 4,515,115, 4,664,075, 4,719,879, 4,867,110, and 5,642,698.

A long or large plenum contains slow moving air, thus taking up limited under-hood space without contributing to the highly desired inertia charging that only long runners can produce. Manifolds with a large or long plenum downstream of an air/fuel mixing device are vulnerable to fuel suspension problems such as wall wetting, pooling, and condensation. In addition, runners that begin furthest downstream of the manifold's air inlet can become starved for air under high engine loads, compared to runners that begin nearest the air inlet in manifolds with a long or large plenum.

Category Two; woven-tube configurations. Examples would be U.S. Pat. Nos. 2,862,490, 4,228,769, 4,341,186, 4,409,934, 5,074,258, 5,144,918, and 6,283,078.

Woven-tube manifolds are excessively heavy and voluminous for the runner length they provide due to the paths they must travel to avoid running into each other, their inability to share common walls, their usually round shape, and the need of the runners to be traveling in many different planes in order to provide sufficient runner length. The multi-plane dimensionality of these manifolds makes them rather difficult and expensive to produce by the sand-cast methods normally used to produce metal manifolds. Woven-tube style manifolds use runners with round internal cross-sections which then change to a generally rectangular shape at the intake port, thereby creating turbulence and reducing the desired inertia charging effect.

Category Three; highly meandered or labyrinth configurations. Examples would be U.S. Pat. Nos. 5,655,492, and 5,704,325.

Meandered or labyrinth manifolds create theoretically long runners in very compact dimensions, but the high number of changes in flow direction creates turbulence that leads to large inertia losses and significant fuel suspension problems.

BRIEF SUMMARY OF THE INVENTION

The object of the invention is to produce an intake manifold for six-cylinder in-line engines with the benefits of compactness, light weight, inertia charging, good fuel suspension properties, and ease of manufacture by traditional metal-casting methods. A further object of this invention is to produce an intake manifold that has the above mentioned benefits and can be retrofitted quickly and easily to many previously manufactured six-cylinder in-line engines. Said previously manufactured engines being originally equipped with a much less effective manifold, said manifold having a centrally mounted carburetor and a substantially single plane design.

The present invention provides for a compact manifold wherein the plenum is generally centered longitudinally, and the runners and plenum are aligned substantially upon the same imaginary plane.

The present invention provides for a compact and light-weight manifold by the use of runners that are generally rectangular in shape, thereby allowing the significant advantage of shared walls between runners.

The present invention provides for a manifold wherein all six intake runners begin substantially equidistant from the air control valve, thus providing substantially equal flow in all runners under all engine loads.

The present invention provides for a manifold with the advantages of small plenum volume due to the arrangement of the runner openings, which begin close to and substantially equidistant from the air control valve.

The present invention provides for inertia charging as a result of uniform and significant individual runner length.

The present invention provides for efficient, non-turbulent flow from the manifold runners into the engine intake ports due to the similarly rectangular shapes of the runners and the engine intake ports.

The present invention provides for an improved manifold that is easily interchanged with less beneficial manifolds on previously produced engines by virtue of a single-plane arrangement and a centrally located plenum.

The present invention provides for ease of manufacture by traditional metal casting processes as a result of shared runner walls and single-plane design.

The present invention provides for good dissolved-fuel suspension properties as a result of small plenum volume and runners that have no more than two turns of flow direction in any one runner.

DETAILED DESCRIPTION OF THE INVENTION

Figure 1:
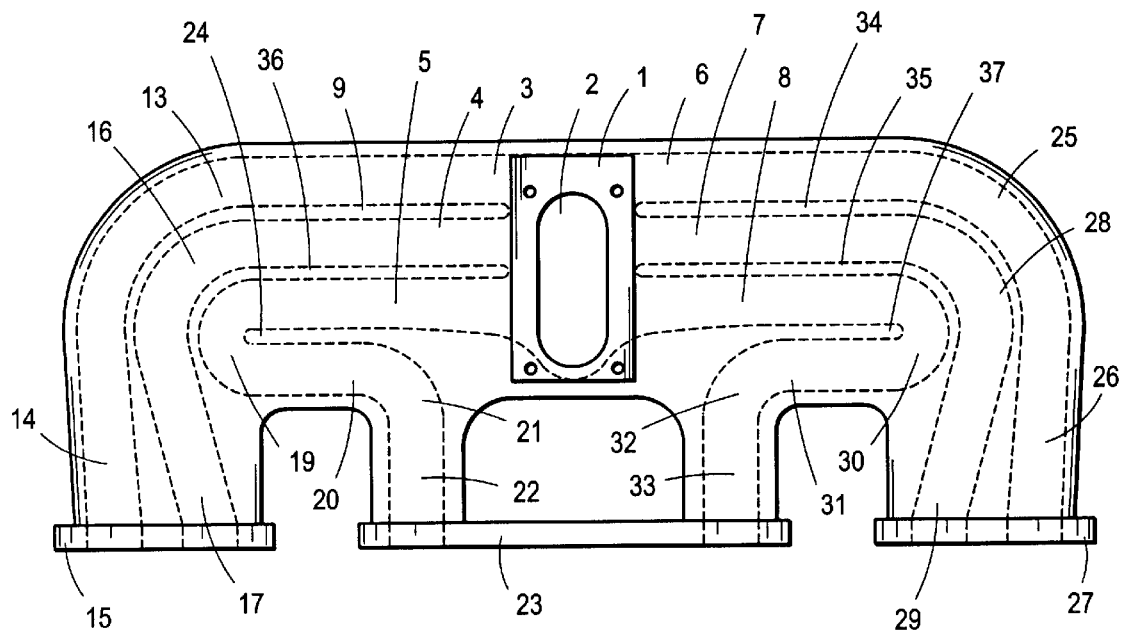
FIG. 1 is a plan view of the intake manifold.

An intake manifold for a six-cylinder in-line internal combustion engine, said manifold having a single plenum and six individual air delivery runners, each runner being dedicated to an individual intake port of the engine. Since different engine manufacturers tend to space intake ports differently, it is not my intention to limit the current invention to the intake port spacing or attachment flange arrangement of FIGS. 1,2,3, and 4, but to show how the current invention is applicable to any six-cylinder in-line engine. For example, FIG. 1 shows the present invention as applicable to typical Jeep/Chrysler 4.2 and 4.0 liter engines while FIG. 3 shows the present invention as applicable to Toyota F and 2F engines. Thus anyone skilled in the pertinent art will understand the wide range of application of the current invention. Since FIGS. 1,2,3, and 4 differ only in the application of the present invention to different engines, all reference numbers apply equally to FIGS. 1,2,3, and 4. A carburetor or other air control valve mounting base 1 is provided, with a plenum 2 directly underneath said mounting base. Mounting base 1 is centrally positioned along the longitudinal axis of the manifold. Six individual runners, each being substantially rectangular in shape throughout their length, have their points of origin at said plenum 2. Each runner has a straight beginning segment 3,4,5,6,7,8 which runs generally parallel to the longitudinal axis of the manifold. Straight segments 3,4,5 begin on the longitudinally rearward side of the plenum and serve the three longitudinally rearward engine intake ports. Straight segments 6,7,8 begin on the longitudinally forward side of the plenum and serve the three longitudinally forward engine intake ports.

The runner with straight beginning segment 3 travels longitudinally rearward to a turn 13 of generally 90 degrees, continues toward the engine along the changed path in straight segment 14 and through an integral attachment flange 15 to the endmost engine intake port. In a path generally parallel to straight segment 3, the runner with straight beginning segment 4 travels longitudinally rearward to 16 a turn of generally 90 degrees, continues toward the engine along the changed path in straight segment 17 and through an integral attachment flange 15 to the second most rearward engine intake port. In a path generally parallel to straight segments 3 and 4, the runner with straight beginning segment 5 travels longitudinally rearward to a turn 19 of generally 180 degrees, travels longitudinally forward along the changed path in straight segment 20 until reaching a turn 21 of generally 90 degrees, travels along the changed path toward the engine in straight segment 22 and passes through integral attachment flange 23 to the third most rearward engine intake port. Runner segments 3 and 4 share a common wall 9, runner segments 4 and 5 share a common wall 36, and runner segments 5 and 20 share a common wall 24.

The runner with straight beginning segment 6 travels longitudinally forward to a turn 25 of generally 90 degrees, continues toward the engine along the changed path in straight segment 26 and through an integral attachment flange 27 to the most forward engine intake port. In a path generally parallel to straight segment 6, the runner with straight beginning segment 7 travels longitudinally forward to a turn 28 of generally 90 degrees, continues toward the engine in straight segment 29 and through an integral attachment flange 27 to the second most forward engine intake port. In a path generally parallel to straight segments 6 and 7, the runner with straight beginning segment 8 travels longitudinally forward to a turn 30 of generally 180 degrees, travels longitudinally rearward along the changed path in straight segment 31 until reaching a turn 32 of generally 90 degrees, travels along the changed path in straight segment 33 and passes through integral attachment flange 23 to the third most forward engine intake port. Runner segments 6 and 7 share a common wall 34, runner segments 7 and 8 share a common wall 35, and runner segments 8 and 31 share a common wall 37.

Figure 2:
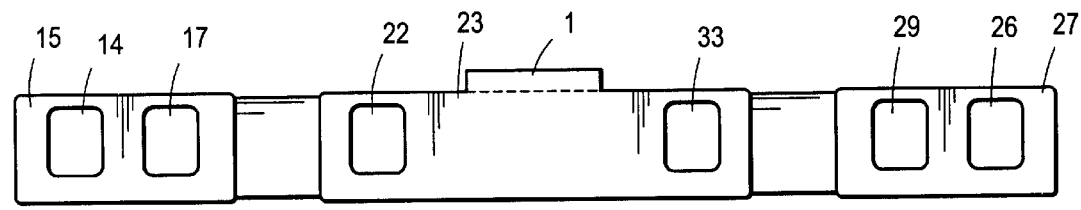
FIG. 2 is a side elevation view of FIG. 1 at the surface of attachment to an engine.
Figure 3:
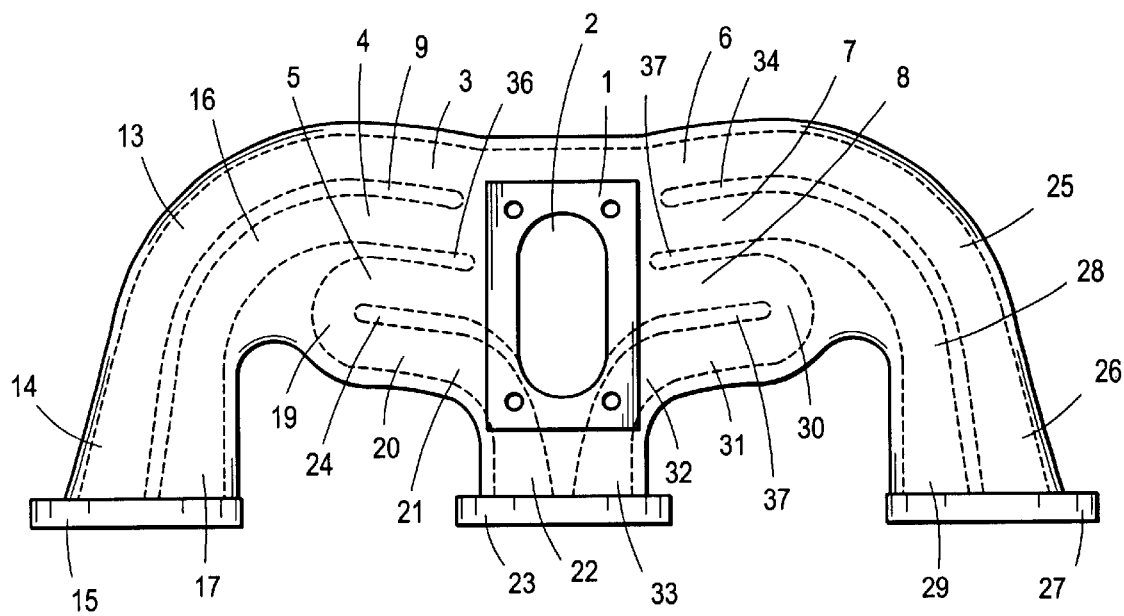
FIG. 3 is a plan view of another embodiment of the intake manifold.
Figure 4:
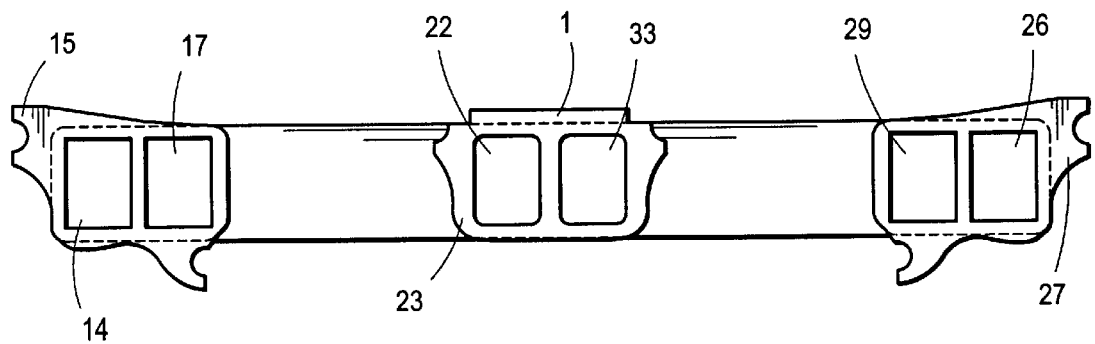
FIG. 4 is a side elevation view of FIG. 3 at the surface of attachment to an engine.

The side elevation views of FIG. 2 and FIG. 4 illustrate the cross section of the runners where they meet the engine intake ports. The substantially rectangular shape at this end of the runners is indicative of the substantially rectangular cross section throughout their length. Since one of the intentions of this invention is to provide smooth flow from runner to intake port, the ratio of the sidewall lengths of the substantially rectangular runners would be similar to the intake port proportions of the specific engine application. In the same way, the number of integral mounting flanges and their arrangement will vary as the current invention is applied to various engines.

What I claim as my invention is:

1. An intake manifold with inertia charging benefits for six-cylinder in-line engines with:

a single plenum that is centrally positioned along the longitudinal axis of the manifold, this longitudinal axis paralleling the longitudinal axis of the engine, six individually dedicated runners of substantially equal internal cross-section and substantially equal length, each of said runners beginning at a shared singular plenum of defined central location and ending at a designated corresponding individual cylinder intake port of the engine, the interior shape of the runners being substantially rectangular throughout their length and consequently able to share walls between runners to the most advantageous extent, the walls defining the bottom of the intake runners being substantially in the same plane, said plane being generally perpendicular to the longitudinally vertical plane of the engine, the end segments of the of the six individual intake runners being arranged in two oppositely disposed sets of three at their point of origin at the plenum, each set of three runner intakes is arranged as to begin generally equidistant from the transverse centerline of the plenum, one set of three runners originating on the longitudinally rearward side of the plenum serving the longitudinally rearward three engine intake ports, one set of three runners originating on the longitudinally forward side of the plenum serving the longitudinally forward three engine intake ports, the three runners and their paths on the longitudinally rearward side of the plenum being substantially symmetrical to the three runners and their paths on the longitudinally forward side of the plenum.

2. The intake manifold according to claim 1 wherein the runner which begins furthest from the engine within each set of three oppositely disposed and substantially symmetrical runner sets travels away from the plenum in a direction generally longitudinal with the longitudinal axis of the manifold, makes one turn of generally 90 degrees toward the engine and travels along the changed path and through an integral attachment flange to the corresponding location of the individually designated endmost engine intake port.

3. The intake manifold according to claim 1 wherein the runner which begins second furthest from the engine within each set of three oppositely disposed and substantially symmetrical runner sets travels away from the plenum in a direction generally longitudinal with the longitudinal axis of the manifold, makes one turn of generally 90 degrees toward the engine and travels along the changed path and through an integral attachment flange to the corresponding location of the individually designated second endmost engine intake port.

4. The intake manifold according to claim 1 wherein the runner which begins closest to the engine within each set of three oppositely disposed and substantially symmetrical runner sets travels away from the plenum in a direction generally longitudinal with the longitudinal axis of the manifold, makes one turn of generally 180 degrees, travels along the changed path in the general direction of the plenum, makes one turn of generally 90 degrees toward the engine and travels along the changed path and through an integral attachment flange to the corresponding location of the individually designated third endmost engine intake port.

* * * * *